No. 774,910. PATENTED NOV. 15, 1904.
F. H. CRAWFORD.
VARIABLE PRESSURE COMPENSATING MECHANISM FOR GAS METERS.
APPLICATION FILED MAR. 28, 1904.
NO MODEL.
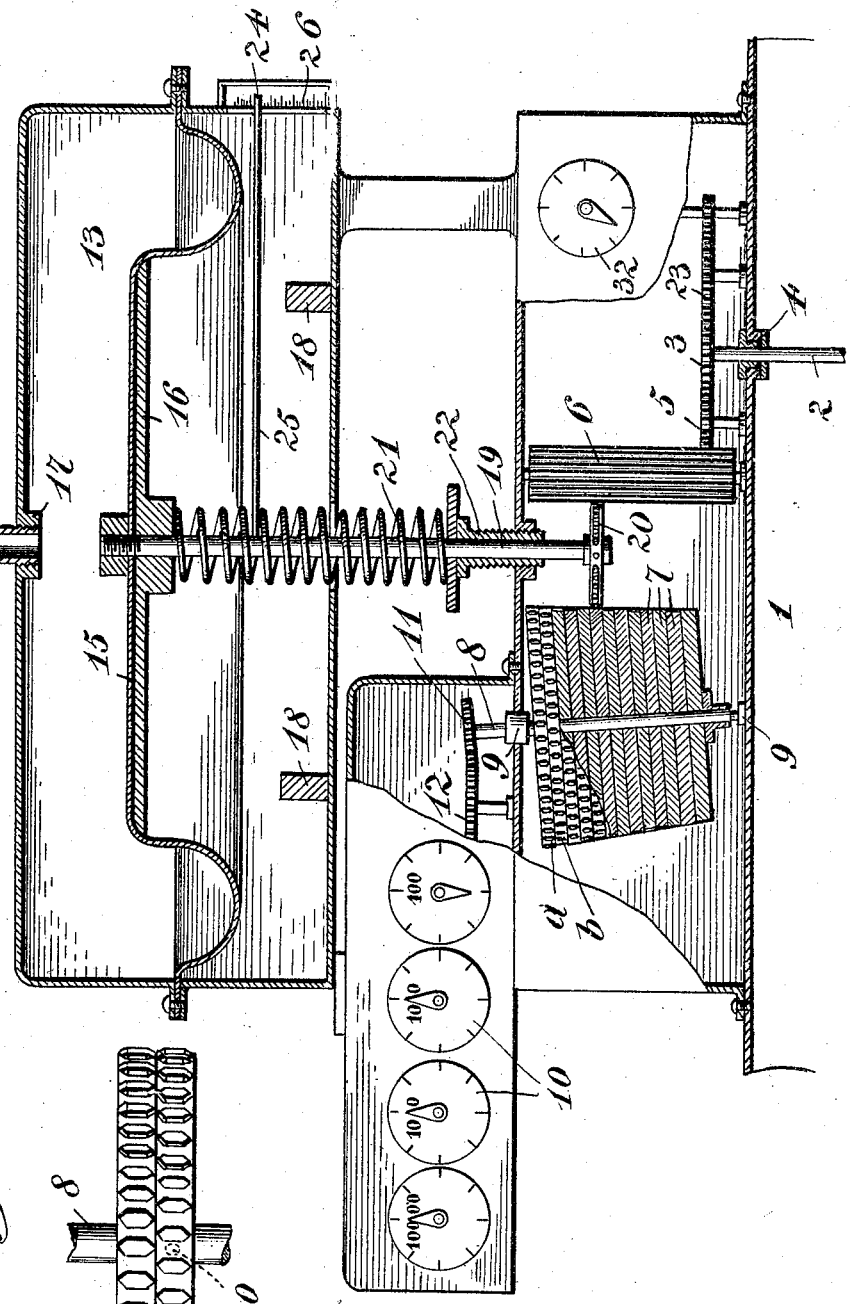
Witnesses
C. Muntzer
L. O. Helton
Inventor
F. H. Crawford
by H. B. Willson
Attorney No. 774,910.

Patented November 15, 1904.

UNITED STATES PATENT OFFICE.

FRANCIS H. CRAWFORD, OF COLUMBUS, OHIO.

VARIABLE-PRESSURE-COMPENSATING MECHANISM FOR GAS-METERS.

SPECIFICATION forming part of Letters Patent No. 774,910, dated November 15, 1904.

Application filed March 28, 1904. Serial No. 200,403. (No model.)

*To all whom it may concern:*

Be it known that I, FRANCIS H. CRAWFORD, a citizen of the United States, residing at Columbus, in the county of Franklin and State of Ohio, have invented certain new and useful Improvements in Variable-Pressure-Compensating Mechanism for Gas-Meters; and I do declare the following to be a full, clear, and exact description of the invention, such as will enable others skilled in the art to which it appertains to make and use the same.

My invention is an improved variable-pressure-compensating mechanism for gas-meters; and it consists in the construction and combination of devices hereinafter described and claimed.

Gas-meters of the varieties now in common use for measuring natural gas are not affected by variations in the pressure thereof, and hence are inaccurate, as the actual quantity of gas passing through a meter varies with the variations in the gas-pressure.

The object of my invention is to provide means for compensating for variations in the pressure of gas passing through a meter and for recording the actual quantity of gas consumed and to obviate the necessity of making computations when reading the meter.

In the accompanying drawings, Figure 1 is a sectional view of a variable-pressure-compensating mechanism embodying my improvements. Fig. 2 is a detail view showing two of the compensating gears.

A gas-meter of usual form is indicated at 1. In the embodiment of my invention the same has a shaft 2, which is revolved by the usual gas-meter valve (not here shown) and has one end projecting from the meter and provided with a pinion 3. A suitable packing-nut 4 is provided to prevent leakage of gas around the said shaft. This shaft rotates at an invariable rate of speed regardless of the gas-pressure. Connected to the pinion 3 by means of intermediate gear 5 of any suitable construction and arrangement is a long pinion 6, which is hence also rotated at an invariable rate of speed when the meter is in operation. Opposite the long pinion is a series of compensating gears 7, of which there may be any suitable number, thirteen being here shown, and indicated, respectively, by reference-letters in regular sequence, beginning with $a$. These compensating gears vary in diameter and in the number of cogs with which they are provided, each having one cog more than the next compensating gear in the series, beginning with the wheel $a$. Each of these compensating gears is rigidly fixed to an inclined shaft 8, which has its bearings at 9. The inclination of the shaft and the compensating gears is such as to dispose the sides of said gears opposed to the long pinion at an equal distance from the latter.

Indicating-hands and dials of the usual form are shown at 10 and have the usual train of gears to operate the hands, said train of gears being connected to the shaft 8 of the compensating gears by a pinion 11 on said shaft and an idler-gear 12. This, however, may be varied without departing from the spirit of my invention.

I further provide a gas-chamber 13, which has a connection 14 to the gas-inlet pipe of the meter. This chamber contains an element which is movable by variations of gas-pressure in said chamber. Said gas-pressure movable element is here shown as comprising a diaphragm 15, of rubber or other suitable material, and a disk 16 on the under side thereof and secured thereto. Stops 17 18 limit the movements of the said element in opposite directions. A shaft 19 extends from and is movable by the said movable element and carries a loose gear 20, which engages and is slidable on the long pinion and is adapted to engage and rotate each of the compensating gears in succession when it is moved in one direction or the other by the diaphragm. A spring 21 exerts its pressure against one side of the diaphragm to countervail the gas-pressure on the opposite side of the diaphragm. When there is standard gas-pressure in the chamber 13—say a pressure of four ounces to the inch—the spring moves the diaphragm against the stops 17. The tension of the spring may be regulated by turning the screw-sleeve 22, in which the shaft 19 is movable.

The operation is as follows: Assuming that the gas-pressure is four ounces, the gear 20, which is rotated by the long pinion, will be in engagement with the gear $a$, and the registering mechanism 10 will be driven by the said gear $a$ at the rate of speed appropriate to that pressure. On an increase of pressure, say, to five ounces the diaphragm will be moved thereby against the tension of the spring 21 a sufficient distance to move the gear 20 out of engagement with the compensating gear $a$ and into engagement with the compensating gear $b$, which, owing to the decreased number of its cogs, will be driven at a slightly-increased rate of speed, and hence the registering mechanism will have its speed accordingly increased.

Under actual conditions in the sale of natural gas one thousand feet at four ounces pressure is considered the exact quantity of gas for which a consumer should pay the established price per thousand feet. On an increase of the pressure the density of the gas is correspondingly increased, and the ratio of increase is about four and one-fourth cubic feet per thousand for each ounce increase in pressure. In other words, one thousand feet of gas at five ounces pressure would in reality be one thousand and four and one-fourth cubic feet, although the meter, if unprovided with my improved compensating mechanism, would register only one thousand cubic feet. Heretofore in reading the meter and stating accounts it was customary to make computations based upon the known variations of gas-pressure during a given period. My improved compensating mechanism makes such computations unnecessary, and it may be readily used in connection with any of the common forms of domestic or proportional gas-meters.

As shown in the drawings, an indicator 32 is provided for registering the number of feet of gas passing through the meter during a given period of time regardless of the variations in the gas-pressure and to prove the accuracy of the meter. This indicator is operated by the shaft 2, being connected thereto by a suitable train of gear-wheels, one of which is shown at 23 and engages the pinion 3 of said shaft. An indicator may also be employed to show with which one of the compensating gears the gear 20 is engaged at any time. This last-mentioned indicator comprises a hand 24, carried by a rod 25, that projects from the shaft 19, and a scale 26, corresponding to the compensating gears, over which scale the said hand moves.

For the purposes of this specification the spurs or cogs of the compensating gears are shown as angular in cross-section, with vertical parallel sides and their upper and lower edges beveled or inclined on opposite sides, and the spurs of the gear 20 are shown as of cylindrical form to enable the gear 20 to pass freely from one compensating gear to another as required during the operation of the device under different gas-pressures.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a gas-meter, the combination of a long pinion driven at an invariable rate of speed, compensating gears of varying diameter, a shaft common to said compensating gears and rotated thereby, a registering mechanism geared to and driven by said shaft, an idler-gear engaging the long pinion and movable into engagement with either of the compensating gears, and means, operated by variations of gas-pressure, to so move the idler-gear, substantially as described.

2. In a gas-meter, the combination of a long pinion driven at an invariable rate of speed, compensating gears of varying diameter, a registering mechanism driven thereby, an idler-gear engaging the long pinion and movable into engagement with either of the compensating gears, a gas-chamber, an element movable therein in one direction by gas-pressure, a spring to move said element in the reverse direction upon a diminution of the gas-pressure, and a connection between the said element and the idler-gear to move the latter into engagement with the respective compensating gears when the said element is moved, substantially as described.

3. In a gas-meter, the combination of a long pinion driven at an invariable rate of speed, compensating gears of varying diameter, a registering mechanism driven thereby, an idler-gear engaging the long pinion and movable into engagement with either of the compensating gears, a gas-chamber, an element movable therein in one direction by gas-pressure, a spring to move said element in the reverse direction upon a diminution of the gas-pressure, means to vary the tension of said spring, and a connection between the said element and the idler-gear, to move the latter into engagement with the respective compensating gears when the said element is moved, substantially as described.

In testimony whereof I have hereunto set my hand in presence of two subscribing witnesses.

FRANCIS H. CRAWFORD.

Witnesses:
   E. G. Orebaugh,
   R. C. Wright.